(12) United States Patent
Stoner

(10) Patent No.: US 6,266,397 B1
(45) Date of Patent: Jul. 24, 2001

(54) INTERFACING DEVICE TO BE USED WITH A TELEPHONE SYSTEM TERMINAL FOR TRANSMITTING EXTENDED STATION INFORMATION TO A PUBLIC SAFETY ANSWERING POINT

(76) Inventor: David M. Stoner, 619 Doepke La., Cincinnati, OH (US) 45231

( * ) Notice: Subject to any disclaimer, the term of this patent is extended or adjusted under 35 U.S.C. 154(b) by 0 days.

(21) Appl. No.: 09/259,535

(22) Filed: Mar. 1, 1999

(51) Int. Cl.[7] .................................................. H04M 11/00
(52) U.S. Cl. ............................. 379/45; 379/37; 379/93.07
(58) Field of Search .................................. 379/45, 37, 38, 379/39, 49, 93.07, 93.14, 93.17, 93.23

(56) References Cited

U.S. PATENT DOCUMENTS

| | | | |
|---|---|---|---|
| 4,873,718 | * 10/1989 | Barnett et al. | 379/156 |
| 5,161,180 | * 11/1992 | Chavous | 379/45 |
| 5,222,124 | * 6/1993 | Castaneda et al. | 379/269 |
| 5,235,630 | * 8/1993 | Moody et al. | 379/45 |
| 5,339,351 | * 8/1994 | Hoskinson et al. | 379/45 |
| 5,347,567 | * 9/1994 | Moody et al. | 379/45 |
| 5,347,568 | 9/1994 | Moody et al. | |

* cited by examiner

Primary Examiner—Stella Woo
(74) Attorney, Agent, or Firm—Thomas I. Rozsa; Tony D. Chen; Jerry Fong

(57) ABSTRACT

A method or apparatus to be used with a telephone system, such as a private branch exchange (PBX) trunk, for transmitting extended station information to an emergency call handling center, such as a public safety answering point (PSAP). The apparatus has a central processing unit (CPU) which is connected a PBX interface, a memory database, a first loop interface, and a second loop interface. The PBX interface is connected to the PBX trunk and receives an emergency call from a specified station which initiated the emergency call. The memory database stores information on the plurality of extension stations within a facility. The first loop interface is connected to the PSAP. The second loop interface is also connected to the PSAP. The CPU connects the audio of the emergency call to the first loop interface which in turn transmits the audio to the PSAP. The CPU searches the memory database for information about the specified station which initiated the emergency call, whereby the CPU sends extended station information to the PSAP over the second loop interface while maintaining contact between the specified station which initiated the emergency phone call and the PSAP.

32 Claims, 4 Drawing Sheets

INTERFACING DEVICE TO BE USED WITH A TELEPHONE SYSTEM TERMINAL FOR TRANSMITTING EXTENDED STATION INFORMATION TO A PUBLIC SAFETY ANSWERING POINT

BACKGROUND OF THE INVENTION

1. Field of the Invention

The present invention generally relates to the field of modern telecommunication technologies and devices. More particularly, the present invention relates to the field of interfacing devices to be used with a telephone system terminal for transmitting information to a telephone provider's central office which is in turn connected to one or more public safety answering points (PSAPs).

2. Description of the Prior Art

In many cities and communities, public safety answering points (PSAPs) have been established to answer emergency phone calls. In an emergency situation, a caller from the emergency spot places an emergency phone call through the telephone system and the emergency phone call will be routed to a PSAP. Currently most telephone systems have the function of identifying the emergency telephone number to the PSAP so that the PSAP can locate the emergency spot and provide quick response.

In many business establishments such as a large company, hotels, department stores, etc., private branch exchange (PBX) systems are used which handle many extension telephone stations. This poses a problem for identifying the exact emergency location within such business establishment. With the current telephone systems, when an emergency phone call is placed from an extension station within a PBX system, the phone call can be routed to a PSAP.

However, since the phone call from the extension station passes through the PBX system first, the PSAP will only know the identification of the PBX system without knowing the particular extension stations. As a result, when the emergency personnel arrive at the business establishment, they are often at a loss as to where exactly the emergency location is and they have to search through many offices in the office building or many suites in the hotel or many floors in the department store.

Therefore, there is a need in the telephone network and emergency response network to provide further identification of the extension station within a PBX system from which an emergency phone call is made.

U.S. Pat. No. 5,347,568 issued to Moody et al. on Sep. 13, 1994 for "Emergency Call Station Identification System" discloses a device for identifying a specific station, among a plurality of geographically-dispersed stations represented by a common telephone number and serviced by a common PBX, which has initiated an emergency "9-1-1" telephone call. The device can identify the specific station which initiated the emergency "9-1-1" telephone call to the appropriate PSAP which is connected to an enhanced "9-1-1" emergency call network. The device has functions to convert the protocol of the PBX to the protocol of the emergency call network. It also assigns an arbitrary designation representing the specific station which initiated the emergency phone call.

In many emergency situations, simply identifying the extension station from which an emergency phone call is made is insufficient. For example, it is also desirable for the emergency crew to know where the extension station is located, directions to that particular location, etc.

In addition, it is also desirable for the on-site management personnel or the security staff to be alerted as well when an emergency phone call was made by one of the extension stations of the PBX system.

Therefore, it is highly desirable to provide an interfacing device to be used with a telephone system for translating extended station information to one or more PSAP.

SUMMARY OF THE INVENTION

The present invention is a method and emergency interfacing device to be used with a telephone system terminal, such as a private branch exchange (PBX) trunk, for transmitting extended station information to an emergency call handling center, such as a public safety answering point (PSAP).

It is an object of the present invention to provide an emergency interfacing device connected between a telephone system terminal and a telephone provider's central office for transmitting extended station information during an emergency situation to one or more PSAPs.

It is also an object of the present invention to provide an emergency interfacing device to alert on-site management personnel or security staff in the local facility that an emergency phone call has been made by one of the extension stations within the facility at the inception of the call, and to provide information about the extension station from which the emergency phone call is made.

Described generally, the present invention is an interfacing device connected between a telephone system terminal and a telephone provider's central office which in turn is connected to one or more PSAPs, wherein the telephone system terminal services a plurality of extension stations within a local facility.

The present invention interfacing device includes a PBX interface means for connecting to the telephone system terminal and receiving an emergency call from a specified one of the plurality of extension stations which initiated the emergency call. The interfacing device also includes a memory means for storing information of the plurality of extension stations within the local facility. The interfacing device further includes a first interface means and a second interface means both connected to the telephone provider's central office.

At the heart of the present invention interfacing device is a central processing unit (CPU), which is connected to the PBX interface means, the memory means, the first interface means and the second interface means. The CPU performs sequential logical operations. It connects the audio signal of the emergency call to the first interface means which in turn transmits the audio signal to the central office which in turn transmits to one or more PSAPs. Meanwhile, the CPU searches the memory means for information about the specified one of the plurality of extension stations which initiated the emergency call. The CPU then sends the extended station information to the central office over the second interface means, while maintaining contact between the specified one of the plurality of extension stations which initiated the emergency phone call and the central office through the first interface means.

Basically, when an emergency call is initiated from one of the plurality of extension stations within a telephone system terminal in the local facility, the present invention interfacing device can transmit extended station information of the extension station to a central office which in turn transmits to one or more PSAPs, and also alert on-site personnel or security staff in the local facility that an emergency phone call has been initiated by one of the extension stations within the facility at the inception of the call.

The present invention has many unique features and advantages. It can provide not only the identity of the extension station within a telephone system that made the emergency phone call but also other vital information about the emergency situation, such as the location of the extension station, direction to that location, physical description of the location, etc. It can also alert at the inception of the emergency phone call the on-site management personnel or security staff of the same information so that immediate response can be made and further assistance to the emergency personnel can be provided. Where the PBX serves a large site, the device, due to stored information unique to each extension of the PBX can provide the information to the PSAP which they would need to direct responding emergency people to different entry points to the site. If the site is large enough to cover more than one political area resulting in service by more than one PSAP, it can direct calls to the PSAP specific to the specific station originating the emergency call.

The present invention can be part of a manufactured telephone system.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

A preferred embodiment of the present invention is an emergency interfacing device which is connected between a private branch exchange (PBX) trunk through a central office to a public safety answering point (PSAP). The purpose of the present invention is not only to provide extended station information of the extension station within a PBX system from which an emergency phone call is made, but also to alert the on-site management personnel or security staff at the inception of the emergency phone call so that immediate response can be made and further assistance to the emergency personnel can be provided by the on-site management personnel or security staff.

Figure 1:
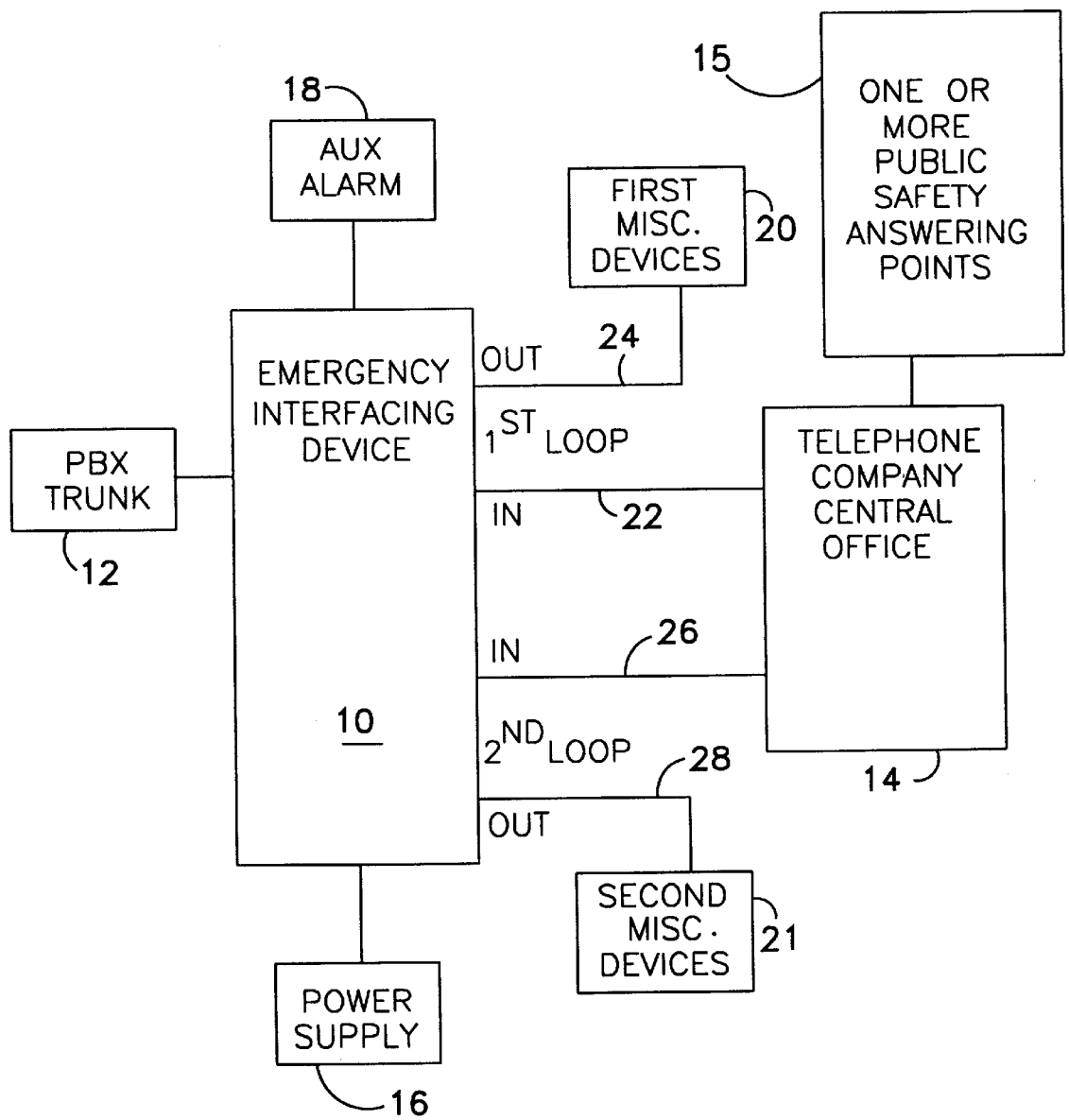
FIG. 1 is an illustrative block diagram showing the arrangement of the present invention emergency interfacing device connected between a private branch exchange (PBX) trunk and a telephone provider's central office which is in turn connected to one or more public safety answering points (PSAPs)

Referring to FIG. 1, there is shown an illustrative block diagram showing one preferred arrangement of the present invention emergency interfacing device 10. The emergency interfacing device 10 is connected to a telephone system terminal such as a PBX trunk 12, a power supply 16, and an alarm 18. The interfacing device 10 also has connections which are connected to miscellaneous devices 20 and 21 such as facsimile machines, credit card machines, etc. One of the unique features of the present invention interfacing device 10 is that it has two loop connections connected to a telephone provider's central office 14 which is in turn connected to one or more PSAPs 15: the $1^{st}$ loop connection has an "IN" terminal 22 connected to the central office 14 and an "OUT" terminal 24 connected to the first miscellaneous devices 20, and the $2^{nd}$ loop connection also has an "IN" terminal 26 connected to the central office 14 and an "OUT" terminal 28 connected to the second miscellaneous devices 20. The purpose and advantages of this arrangement will be discussed in detail below.

Figure 2:
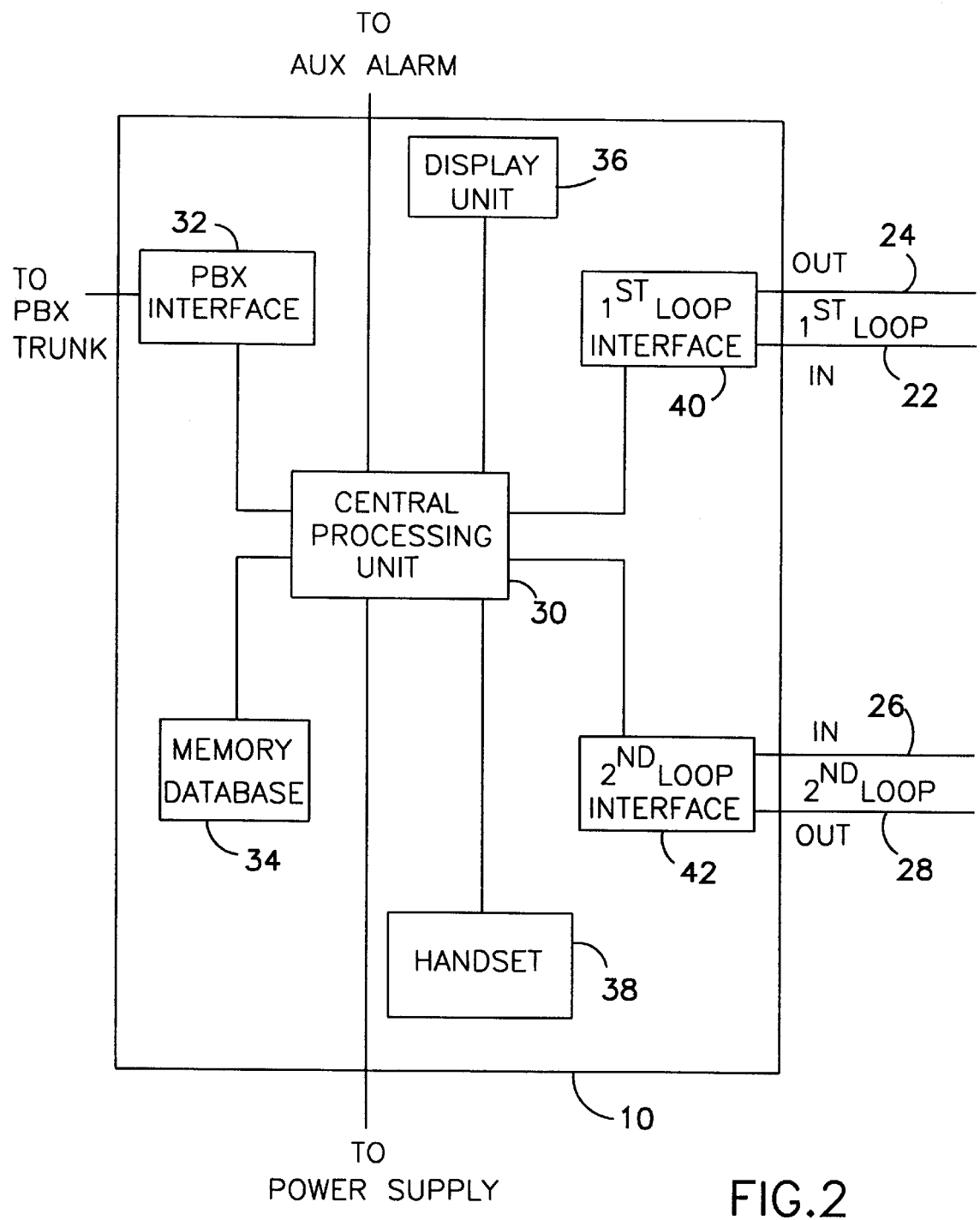
FIG. 2 is an illustrative block diagram showing the basic components of the present invention emergency interfacing device connected between a PBX trunk and a PSAP.

Referring to FIG. 2, there is shown an illustrative block diagram showing the basic components of the present invention emergency interfacing device 10. The interfacing device 10 includes a central processing unit (CPU) 30, a PBX interface 32, a memory database 34, a display unit 36, a handset 38, a $1^{st}$ loop interface 40, and a $2^{nd}$ loop interface 42. The CPU 30 has connections which are connected to the PBX interface 32, the memory database 34, the display unit 36, the handset 38, the $1^{st}$ loop interface 40, and the $2^{nd}$ loop interface 42 as shown.

Figure 3:
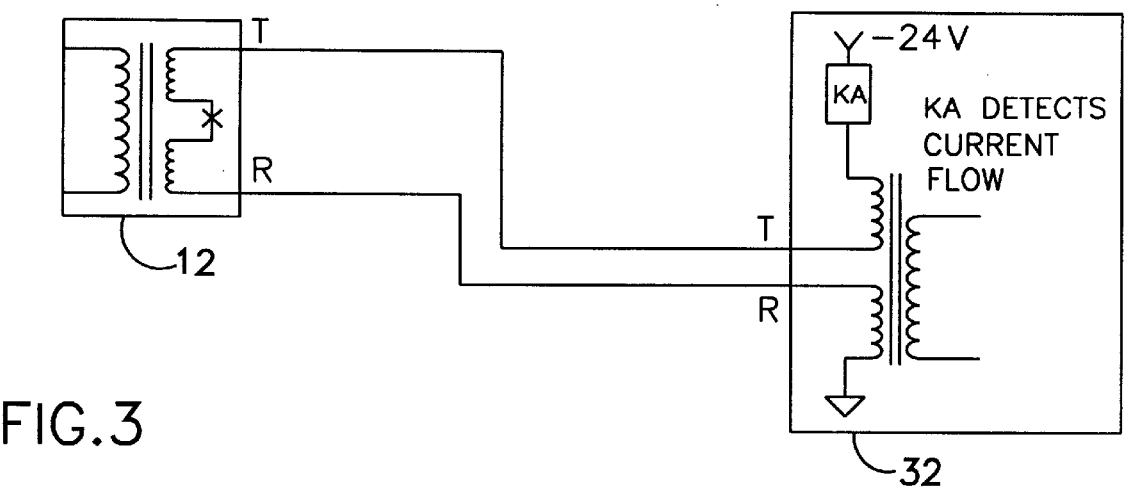
FIG. 3 is an illustrative circuitry diagram showing one embodiment of a PBX interface of the present invention emergency interfacing device connected to a PBX loop trunk with a pair of "T" and "R" terminals.

Referring to FIG. 3, there is shown an illustrative circuitry diagram showing one embodiment of the PBX interface 32 which is a T&R loop trunk circuit of the present invention emergency interfacing device, where the PBX interface 32 is connected to the PBX trunk 12 with a pair of "T" and "R" terminals. The "T" terminal is for tip, and the "R" terminal is for ring.

Figure 4:
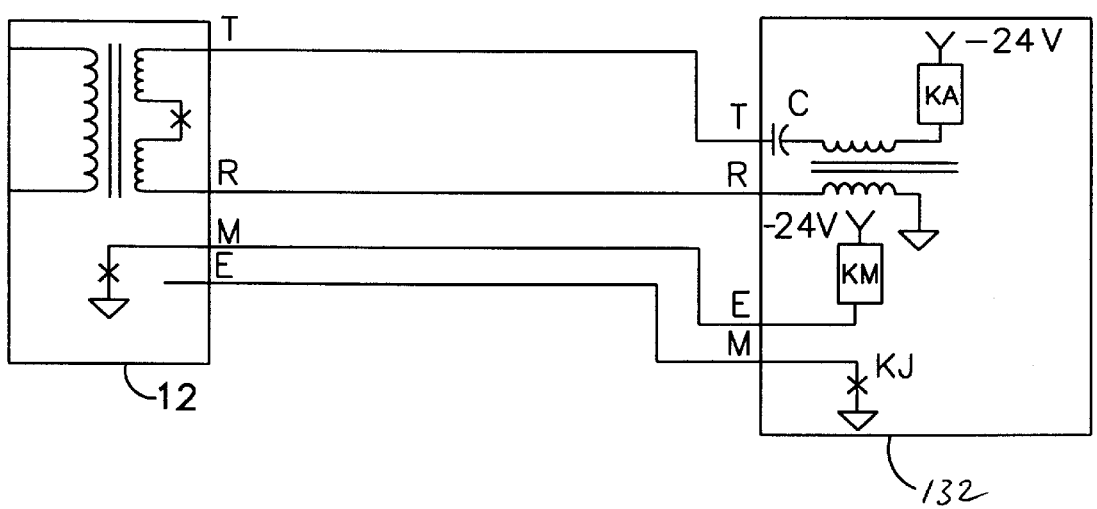
FIG. 4 is an illustrative circuitry diagram showing another embodiment of a PBX interface of the present invention emergency interfacing device connected to a PBX E&M tie trunk with a pair of "T" and "R" terminals and a pair of "M and E" terminals.

Referring to FIG. 4, there is shown an illustrative circuitry diagram showing another embodiment of the PBX interface 132 which is an E&M tie trunk circuit of the present invention emergency interfacing device, where the PBX interface 132 is connected to the PBX trunk 12 with a pair of "T" and "R" terminals and a pair of "M" and "E" terminals. The "T" terminal is for tip, and the "R" terminal is for ring, while the "M" and "E" terminals, on the other hand, are control terminals. The "E" terminal of the PBX trunk 12 connects to the "M" terminal of the PBX interface 132, where the "E" terminal receives while the "M" terminal transmits. The "M" terminal of the PBX trunk 12 connects to the "E" terminal of the PBX interface 132, where the "M" terminal transmits while the "E" terminal receives.

Figure 5:
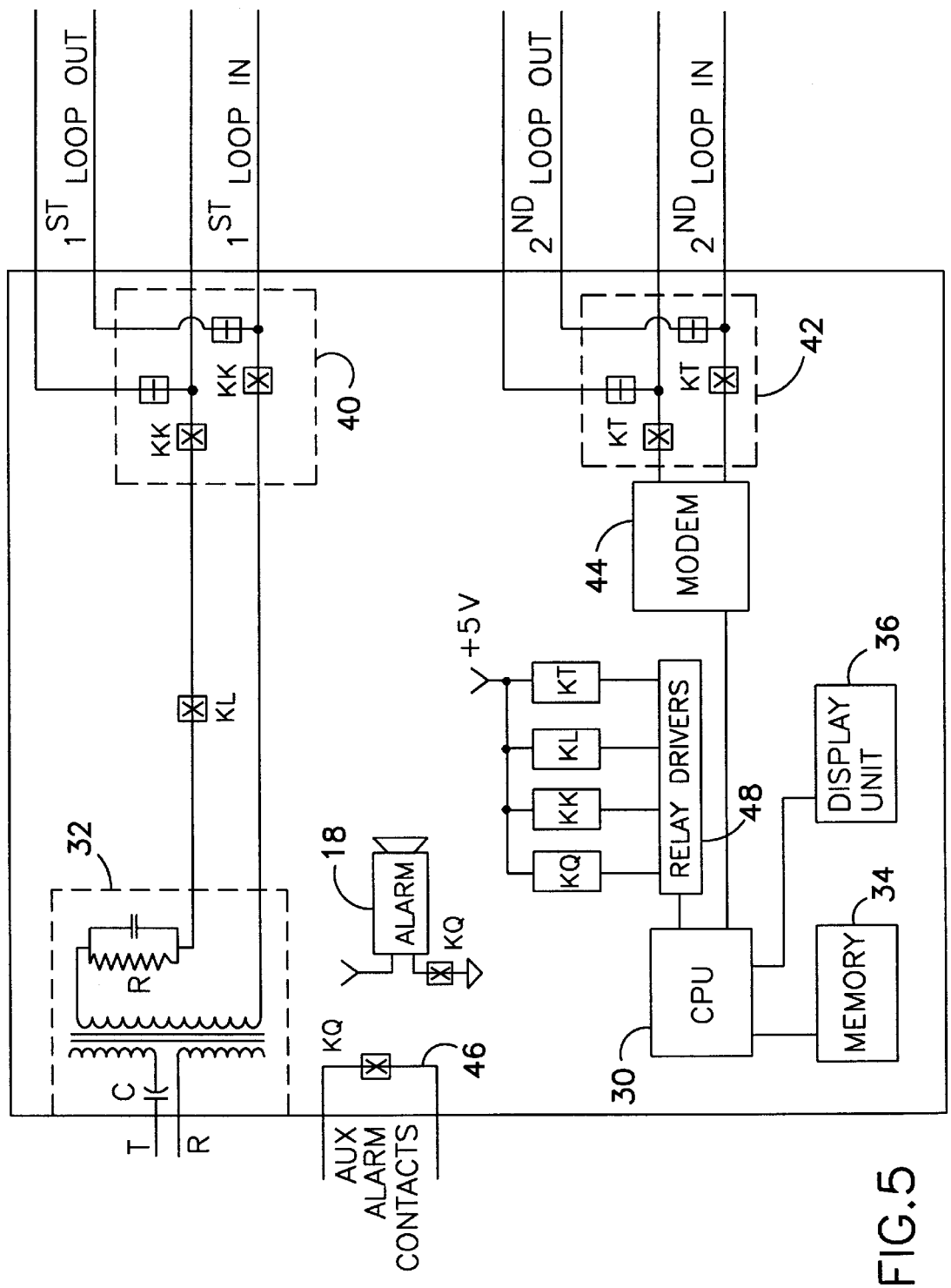
FIG. 5 is an illustrative circuitry diagram showing one embodiment of the present invention emergency interfacing device, with relay drivers identified.

Referring to FIG. 5, there is shown an illustrative circuitry diagram showing one embodiment of the present invention emergency interfacing device, with relay drivers 48 identified. The CPU 30 is further connected to a modem 44 and the relay drivers 48. The CPU 30 controls the relay drivers 48 which in turn activate or deactivate relays KQ, KK, KL, KT and other relays, which in turn control auxiliary alarm contacts 46, the alarm 18, the PBX interface 32, and the $1^{st}$ and $2^{nd}$ loop interfaces 40 and 42.

Referring to FIGS. 1, 2, 3, and 5, an emergency phone call begins by seizure of the T&R loop circuit by the PBX trunk 12 (see FIG. 3) or the PBX trunk 12 grounds "E" terminal if input is the E&M tie trunk circuit (see FIG. 4). The PBX interface 32 detects the incoming emergency phone call and notifies the CPU 30 that an emergency phone call is being made. The CPU 30 preforms sequential logical operations. The CPU 30 disconnects the loads such as the miscellaneous devices 20 and 21 from the $1^{st}$ loop interlace 40 and the $2^{nd}$ loop interface 42. The CPU 30 connects the audio transmission of the emergency phone call from the extension station through the $1^{st}$ loop interface 40, which in turn is connected to the telephone provider's central office 14 and subsequently to one or more PSAPs 15 through the "IN" terminal 22 of the $1^{st}$ loop connection. This is an analog signal. This audio transmission is maintained between the extension station of the PBX trunk 12 and the PSAP 15.

The CPU 30 further activates the alarm 18 and also operates alarm contacts 46, while the alarm 18 sounds continuously. The alarm 18 alerts the on-site management personnel or security staff in the local facility that an emergency phone call has been made by one of the extension stations within the facility at the inception of the emergency phone call, and the CPU 30 provides information about the extension station from which the emergency phone call is made. The alarm 18 will continue to sound while the display unit 36 displays the origin of the emergency phone call. The on-site management personnel or security staff can monitor the emergency phone call by listening on the handset 38. They may enter the conversation by holding down a button (not shown).

The CPU 30 displays the origin of the emergency phone call on the display unit 36 while searching the memory database 34 for information about the extension station where the emergency phone call is made. The information about the extension station is then transmitted over the modem 44 and the $2^{nd}$ loop interface 42 through the "IN" terminal 26 of the $2^{nd}$ loop connection. The CPU 30 transmits the pertinent information, such as the location of the extension station, direction to the location, physical description of the location, and etc., through the telephone provider's central office 14 to the PSAP 15. This is data.

A computer software program may be utilized to implement the functional and logical operations of the present invention process on the present invention emergency interfacing device. The detailed definitions, modules, routines and instructions of the computer program may depend on the particular characteristics of the hardware equipment of the PBX trunk and the CPU of the interfacing device, which can be derived by a skilled computer software engineer or programmer according to the teachings of the present invention.

Defined in detail, the present invention is an interfacing device for connecting a telephone system to a call handling center which is in turn connected to at least one public safety answering point (PSAP) for providing information, the telephone system servicing a plurality of extension stations within a local facility, the interfacing device comprising: (a) PBX interface means for connecting to the telephone system and receiving an emergency phone call from a specified one of the plurality of extension stations which initiated the emergency phone call; (b) a display unit for displaying information about the specified one of the plurality of extension stations which initiated the emergency phone call; (c) memory means for storing information on the plurality of extension stations within the local facility; (d) $1^{st}$ loop interface means having a $1^{st}$ loop connection for connecting to the call handling center; (e) $2^{nd}$ loop interface means having a $2^{nd}$ loop connection for also connecting to the call handling center; (f) a central processing unit (CPU) connected to the PBX interface means, the display unit, the memory means, the $1^{st}$ loop interface means and the $2^{nd}$ loop interface means, and performing sequential logical operations; (g) the CPU connecting the audio of the emergency phone call to the $1^{st}$ loop interface means which in turn transmits the audio through the call handling center to the at least one PSAP through the $1^{st}$ loop connection; and (h) the CPU displayed the origin of the specified one of the plurality of extension stations which initiated the emergency phone call on the display unit while searching the memory means for information about the specified one of the plurality of extension stations, the CPU sends the extended station information through the call handling center to the at least one PSAP over a modem which is in turn connected to the $2^{nd}$ loop interface means while maintaining contact between the specified one of the plurality of extension stations which initiated the emergency phone call and the at least one PSAP; (i) whereby when the emergency phone call is initiated from the specified one of the plurality of extension stations within the telephone system in the local facility, the interfacing device can transmit extended station information of the extension station through the call handling center to the at least one PSAP, and also alert on-site personnel or security staff in the local facility that an emergency phone call has been initiated by one of the extension stations within the facility at the inception of the call.

Defined broadly, the present invention is an interfacing device for connecting a telephone system to a call handling center which is in turn connected to at least one public safety answering point (PSAP), the telephone system servicing a plurality of extension stations within a local facility, the interfacing device comprising: (a) PBX interface means for connecting to the telephone system and receiving an emergency call from a specified one of the plurality of extension stations which initiated the emergency call; (b) memory means for storing information on the plurality of extension stations within the local facility; (c) first interface means for connecting to the call handling center; (d) second interface means for also connecting to the call handling center; (e) a central processing unit (CPU) connected to the PBX interface means, the memory means, the first interface means and the second interface means, and performing sequential logical operations; (f) the CPU connecting the audio of the emergency call to the first interface means which in turn transmits the audio through the call handling center to the at least one PSAP; and (g) the CPU searching the memory means for information about the specified one of the plurality of extension stations which initiated the emergency call, the CPU sends the extended station information through the call handling center to the at least one PSAP over transmitting means which is in turn connected to the second interface means while maintaining contact between the specified one of the plurality of extension stations which initiated the emergency phone call and the at least one PSAP; (h) whereby when the emergency call is initiated from the specified one of the plurality of extension stations within the telephone system in the local facility, the interfacing device can transmit extended station information of the extension station through the call handling center to the at least one PSAP, and also alert on-site personnel or security staff in the local facility that an emergency phone call has been initiated by one of the extension stations within the facility at the inception of the call.

Defined more broadly, the present invention is an apparatus for connecting a telephone system to a call handling center which is in turn connected to at least one public safety answering point (PSAP), the telephone system servicing a plurality of extension stations within a facility, the apparatus comprising: (a) means for sensing and receiving an emergency call from a specified station within the telephone system, which initiated the emergency call; (b) means for storing extended station information about the plurality of extension stations within the telephone system; (c) means for transmitting the emergency call from the specified station through the call handling center to the at least one PSAP; and (d) controller means searching the storing means for the extended station information about the specified station, and transmitting the extended station information of the specified station through the call handling center to the at least one PSAP from second transmitting means while maintaining contact between the specified station, which initiated the emergency call and the at least one PSAP; (e) whereby when an emergency call is initiated from the specified station within the telephone system in the facility, the apparatus can transmit the extended station information through the call handling center to the at least one PSAP, and also alert on-site personnel or security staff in the facility that an emergency call has been initiated by one of the extension stations within the facility at the inception of the call.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An interfacing device for connecting a telephone system to a call handling center which is in turn connected to at least one public safety answering point (PSAP) for providing information, the telephone system servicing a plurality of extension stations within a local facility, the interfacing device comprising:

a. PBX interface means for connecting to said telephone system and receiving an emergency phone call from a specified one of said plurality of extension stations which initiated the emergency phone call;

b. a display unit for displaying information about said specified one of said plurality of extension stations which initiated the emergency phone call;

c. memory means for storing information on said plurality of extension stations within the local facility;

d. $1^{st}$ loop interface means having a $1^{st}$ loop connection for connecting to said call handling center;

e. $2^{nd}$ loop interface means having a $2^{nd}$ loop connection for also connecting to said call handling center;

f. a central processing unit (CPU) connected to said PBX interface means, said display unit, said memory means, said $1^{st}$ loop interface means and said $2^{nd}$ loop interface means, and performing sequential logical operations;

g. said CPU connecting the audio of the emergency phone call to said $1^{st}$ loop interface means which in turn transmits the audio through said call handling center to said at least one PSAP through said $1^{st}$ loop connection; and h. said CPU displayed the origin of said specified one of said plurality of extension stations which initiated the emergency phone call on said display unit while searching said memory means for information about said specified one of said plurality of extension stations, said CPU sends the extended station information through said call handling center to said at least one PSAP over a modem which is in turn connected to said $2^{nd}$ loop interface means while maintaining contact between said specified one of said plurality of extension stations which initiated the emergency phone call and said at least one PSAP;

i. whereby when the emergency phone call is initiated from said specified one of said plurality of extension stations within said telephone system in the local facility, the interfacing device can transmit extended station information of the extension station through said call handling center to said at least one PSAP, and also alert on-site personnel or security staff in the local facility that an emergency phone call has been initiated by one of the extension stations within the facility at the inception of the call.

2. The interfacing device in accordance with claim 1, further comprising a power supply for supplying power to the interfacing device.

3. The interfacing device in accordance with claim 1, further comprising a handset for interfacing with the emergency phone call.

4. The interfacing device in accordance with claim 1, further comprising alarm means connected to said CPU which activates the alarm means for notifying the on-site personnel or security staff at the local facility that an emergency phone call has been initiated.

5. The interfacing device in accordance with claim 4, further comprising relay drivers connected to said CPU for activating or deactivating relays which control said PBX interface means, said $1^{st}$ loop interface means, and said $2^{nd}$ loop interface means and said alarm means.

6. The interfacing device in accordance with claim 1, wherein said PBX interface means includes a T&R loop trunk circuit having a pair of "T" and "R" terminals.

7. The interfacing device in accordance with claim 6, wherein the emergency phone call begins by seizure of said T&R loop trunk circuit by said PBX trunk.

8. The interfacing device in accordance with claim 1, wherein said PBX interface means includes an E&M tie trunk circuit having a pair of "T" and "R" terminals and a pair of "M" and "E" terminals.

9. The interfacing device in accordance with claim 8, wherein the emergency phone call begins when said telephone system grounds the "E" terminal if input is the E&M tie trunk circuit.

10. An interfacing device for connecting a telephone system to a call handling center which is in turn connected to at least one public safety answering point (PSAP), the telephone system servicing a plurality of extension stations within a local facility, the interfacing device comprising:

a. PBX interface means for connecting to said telephone system and receiving an emergency call from a specified one of said plurality of extension stations which initiated the emergency call;

b. memory means for storing information on said plurality of extension stations within the local facility;

c. first interface means for connecting to said call handling center;

d. second interface means for also connecting to said call handling center;

e. a central processing unit (CPU) connected to said PBX interface means, said memory means, said first interface means and said second interface means, and performing sequential logical operations;

f. said CPU connecting the audio of the emergency call to said first interface means which in turn transmits the audio through said call handling center to said at least one PSAP; and g. said CPU searching said memory means for information about said specified one of said plurality of extension stations which initiated the emergency call, said CPU sends the extended station information through said call handling center to said at least one PSAP over transmitting means which is in turn connected to said second interface means while maintaining contact between said specified one of said plurality of extension stations which initiated the emergency phone call and said at least one PSAP;

h. whereby when the emergency call is initiated from said specified one of said plurality of extension stations within said telephone system in the local facility, the interfacing device can transmit extended station information of the extension station through said call handling center to said at least one PSAP, and also alert on-site personnel or security staff in the local facility that an emergency phone call has been initiated by one of the extension stations within the facility at the inception of the call.

11. The interfacing device in accordance with claim 10, further comprising a display unit for displaying the extended station information about said specified one of said plurality of extension stations which initiated the emergency phone call.

12. The interfacing device in accordance with claim 11, wherein said CPU displayed the origin of said specified one of said plurality of extension stations which initiated the emergency phone call on said display unit.

13. The interfacing device in accordance with claim 11, further comprising a power supply for supplying power to the interfacing device.

14. The interfacing device in accordance with claim 11, further comprising a handset for interfacing with the emergency phone call.

15. The interfacing device in accordance with claim 11, further comprising alarm means connected to said CPU which activates the alarm means for notifying the on-site personnel or security staff at the local facility that an emergency phone call has been initiated.

16. The interfacing device in accordance with claim 15, further comprising relay drivers connected to said CPU for activating or deactivating relays which control said PBX interface means, said $1^{st}$ loop interface means, and said $2^{nd}$ loop interface means and said alarm means.

17. The interfacing device in accordance with claim 11, wherein said PBX interface means includes a T&R loop trunk circuit having a pair of "T" and "R" terminals.

18. The interfacing device in accordance with claim 17, wherein the emergency phone call begins by seizure of said T&R loop trunk circuit by said PBX trunk.

19. The interfacing device in accordance with claim 11, wherein said PBX interface means includes an E&M tie trunk circuit having a pair of "T" and "R" terminals and a pair of "M" and "E" terminals.

20. The interfacing device in accordance with claim 19, wherein the emergency phone call begins when said telephone system grounds the "E" terminal if input is the E&M tie trunk circuit.

21. The interfacing device in accordance with claim 11, wherein said transmitting means includes a modem.

22. An apparatus for connecting a telephone system to a call handling center which is in turn connected to at least one public safety answering point (PSAP), the telephone system servicing a plurality of extension stations within a facility, the apparatus comprising:

a. means for sensing and receiving an emergency call from a specified station within said telephone system, which initiated the emergency call;

b. means for storing extended station information about said plurality of extension stations within said telephone system;

c. means for transmitting said emergency call from said specified station through said call handling center to said at least one PSAP;

d. controller means searching said storing means for the extended station information about said specified station, and transmitting the extended station information of said specified station through said call handling center to said at least one PSAP from second transmitting means while maintaining contact between said specified station, which initiated the emergency call and said at least one PSAP; and e. said second transmitting means including a modem and a second loop interface having a second loop connection for connecting to said call handling center;

f. whereby when an emergency call is initiated from said specified station within said telephone system in the facility, the apparatus can transmit the extended station information through said call handling center to said at least one PSAP, and also alert on-site personnel or security staff in the facility that an emergency call has been initiated by one of the extension stations within the facility at the inception of the call.

23. The apparatus in accordance with claim 22, further comprising a display unit for displaying said extended station information about said specified station which initiated the emergency call.

24. The apparatus in accordance with claim 23, wherein said controller means displaying the origin of said specified station which initiated the emergency call on said display unit.

25. The apparatus in accordance with claim 22, further comprising alarm means activated by said controller means for notifying the on-site personnel or security staff at the facility that an emergency call has been initiated.

26. The apparatus in accordance with claim 22, wherein said sensing and receiving means includes a PBX interface.

27. The apparatus in accordance with claim 26, wherein said PBX interface includes a T&R loop trunk circuit having a pair of "T" and "R" terminals.

28. The apparatus in accordance with claim 27, wherein the emergency call begins by seizure of said T&R loop trunk circuit by said telephone system.

29. The apparatus in accordance with claim 26, wherein said PBX interface includes an E&M tie trunk circuit having a pair of "T" and "R" terminals and a pair of "M" and "E" terminals.

30. The apparatus in accordance with claim 29, wherein the emergency call begins when said telephone system grounds the "E" terminal if input is the E&M tie trunk circuit.

31. The apparatus in accordance with claim 22, wherein said storing means includes a memory database.

32. The apparatus in accordance with claim 22, wherein said first transmitting means includes a first loop interface having a first loop connection for connecting to said call handling center.

\* \* \* \* \*